3,470,189
HETEROCYCLIC SUBSTITUTED ACETIC ACID DERIVATIVES, INTERMEDIATES THEREFOR, AND PRODUCTION AND USE THEREOF
Herndon Jenkins, Richmond, Va., assignor to A. H. Robins Company, Incorporated, Richmond, Va., a corporation of Virginia
No Drawing. Filed Oct. 24, 1965, Ser. No. 504,992
Int. Cl. C07d 27/26, 29/12; A61k 27/00
U.S. Cl. 260—294
49 Claims

ABSTRACT OF THE DISCLOSURE 3-pyrrolidinyloxy and 3- and 4-piperidinyloxy phenylacetic acid derivatives carrying a further alpha substituent selected from phenyl, thienyl, and naphthyl, the derivative being a lower-alkyl ester thereof or an amide thereof, including substituted amides. Phenyl groups in the compound may also carry substituents. The compounds are useful as analgesic/analgetics. Also, acid and metal salt intermediates useful in the preparation of the active compounds of the invention.

---

The present invention relates to certain novel heterocyclic substituted acetic acid derivatives, and is more particularly concerned with 3-pyrrolidinyloxy and 3- and 4-piperidinyloxy substituted derivatives of acetic acid.

The invention is especially concerned with novel compounds having the formula:

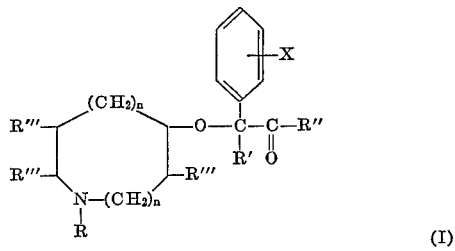

(I)

wherein R is selected from the group consisting of lower-alkyl, lower-alkenyl, phenyllower-alkyl, cycloalkyl, and cycloalkenyl,
wherein R' is selected from the group consisting of phenyl, lower-alkylphenyl, dilower-alkylphenyl, lower-alkoxyphenyl, halophenyl, trifluoromethylphenyl, lower-alkyl-halophenyl, diloweralkyl-aminophenyl, thienyl, and naphthyl,
wherein R" is selected from the group consisting of loweralkoxy, amino (including substituted amino),
wherein R''' is selected from the group consisting of hydrogen and methyl, a maximum of one R''' being other than hydrogen,
wherein X is selected from the group consisting of hydrogen, lower-alkyl, lower-alkoxy, and halogen, and
wherein $n$ is 0 or 1, no more than one $n$ being 1.

The compounds of the invention having the foregoing Formula I exhibit a high order of analgesic/analgetic activity.

The invention is also concerned with novel compounds having the formula:

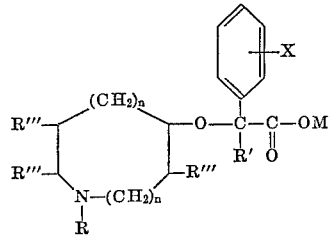

wherein M is a member selected from the group consisting of hydrogen, alkali metals, and alkaline earth metals, and wherein the remaining symbols have the values previously assigned.

It is accordingly an object of the present invention to provide certain new and useful heterocyclic substituted acetic acid derivatives, compositions thereof, and methods of making and using the same. Other objects of the invention will be apparent to one skilled in the art, and still other objects will become apparent hereinafter.

In the definition of symbols in the foregoing Formula I and where they appear elsewhere throughout this specification, the terms have the following significance.

The term "lower-alkyl" as used herein includes straight and branched chain radicals of up to eight carbon atoms inclusive and is exemplified by such groups as methyl, ethyl, propyl, isopropyl, tertiary butyl, amyl, isoamyl, hexyl, heptyl, octyl, and the like. "Lower alkoxy" has the formula —O—lower-alkyl. The term "lower-alkenyl" includes straight and branched chain radicals of three up to eight carbon atoms inclusive and is exemplified by such groups as allyl, methallyl, 4-pentenyl, 3-hexenyl, and 3-methyl-3-heptenyl. The term "cycloalkyl" as used herein includes primarily cyclic alkyl radicals containing three up to nine carbon atoms inclusive and encompasses such groups as cyclopropyl, cyclobutyl, cyclohexyl, cyclopentyl, methylcyclohexyl, propylcyclohexyl, ethylcyclopentyl, propylcyclopentyl, dimethylcyclohexyl, cycloheptyl, and cyclooctyl. The term "cycloalkenyl" as used herein includes cyclic alkenyl radicals containing up to nine carbon atoms inclusive and encompasses the named cycloalkyl radicals having one or more double bonds, including such usual radicals as 2- and 3-cyclohexen-1-yl and 2- and 3-cyclopenten-1-yl. Included in the term "phenyllower-alkyl" are groups such as benzyl, phenethyl, methylbenzyl, phenpropyl, and the like. As stated, the radical R in the foregoing Formula I is inclusive of such groups as lower-alkyl, cycloalkyl, cycloalkenyl, and phenyllower-alkyl, which groups are all preferably radicals of a solely hydrocarbon nature.

When halogen is referred to herein, preferably but not necessarily a halogen of atomic weight in excess of nineteen but not greater than eighty is employed. Of the halogens, chlorine is preferred.

Among the suitable amino radicals included within the symbol R" are primary, secondary and tertiary amino radicals, such as unsubstituted amino (—$NH_2$); lower-alkyl-amino; di-lower-alkyl-amino; lower-alkenyl-amino; di-lower-alkenyl-amino; phenylamino; (hydroxy-lower-alkyl)-amino; di-(hydroxy-lower-alkyl)-amino; lower-alkyl-(hydroxy-lower-alkyl)-amino; basic saturated monocyclic heterocyclic radicals having up to a maximum of twelve carbon atoms, as exemplified by piperidino; lower-alkyl-piperidino, e.g., 2-, 3-, or 4-lower-alkyl-piperidino; di-lower-alkyl-piperidino; e.g., 2,4- 2,6-, or 3,5-di-lower-alkyl-piperidino; lower-alkoxy-piperidino; pyrrolidino; lower-alkyl-pyrrolidino; di-lower-alkyl pyrrolidino; lower-alkoxy-pyrrolidino; morpholino; lower-alkyl-morpholino; di-lower-alkyl-morpholino; thiomorpholino; lower-alkyl-thiomorpholino; di-lower-alkyl-thiomorpholino; piperazino; lower-alkyl-piperazino (e.g., C- or $N^4$-methyl-piperazino); di-C-(lower-alkyl)-piperazino; $N^4$-(lower-alkyl)-C-(lower-alkyl)-piperazino; N-(hydroxy-lower-alkyl)-piperazino; N-(lower-aliphatic acyloxy) and (especially lower-alkanoyloxy lower-alkyl)-piperazino [e.g., N-(acetoxy-, isobutyroxy-, or octanoyloxyethyl or propyl)-piperazino]; N'-lower-alkoxy-lower-alkylpiperazino, e.g., N'-ethoxyethylpiperazino; and lower-carbalkoxy-piperazino.

Among the suitable substituted phenyl radicals are phenyl radicals substituted by any radical or radicals which are not reactive or otherwise interfering under the conditions of reaction, such as lower-alkoxy, lower- alkyl-mercapto, lower-alkyl, di-lower-alkyl-amino, tri-fluoromethyl, halo and the like. The substituted-phenyl radicals have preferably no more than one to three substituents such as those given above and, furthermore, these substituents can be in various available positions of the phenyl nucleus and, when more than one substituent is present, can be the same or different and can be in various position combinations relative to each other. The loweralkyl, lower-alkoxy, lower-alkylmercapto, and di-loweralkyl-amino substituents each have preferably from one to four carbon atoms which can be arranged as straight or branched chains. A total of nine carbon atoms in all ring substituents is the preferred maximum, making a preferred maximum of 15 carbon atoms in the substituted phenyl radical.

When R" is amino, the compounds of Formula I may be converted to and are most conveniently employed in the form of non-toxic physiologically acceptable acid addition or quaternary ammonium salts. Such salts also have improved water-solubility. Although the non-toxic salts are preferred, any salt may be prepared for use as a chemical intermediate, as in the preparation of another but non-toxic acid addition salt. The free basic compounds of Formula I may be conveniently converted to their quaternary ammonium or acid addition salts by reaction of the free base with the selected acid or acid ester, e.g., an alkyl, cycloalkyl, alkenyl, cycloalkenyl or aralkyl halide, sulfate, or sulfonate, preferably in the presence of an organic solvent inert to the reactants and reaction products under the conditions of the reaction. The acids which can be used to prepare the preferred nontoxic acid addition salts are those which produce, when combined with the free bases, salts the anions of which are relatively innocuous to the animal organism in therapeutic doses of the salts, so that beneficial physiological properties inherent in the free bases are not vitiated by side-effects ascribable to the anions.

Appropriate acid addition salts are those derived from mineral acids such as hydrochloric acid, hydrobromic acid, hydriodic acid, nitric acid, sulfuric acid, and phosphoric acid; and organic acids such as acetic acid, citric acid, lactic acid, fumaric acid, and tartaric acid. The preferred acid addition salts are the hydrochlorides and fumarates. The quaternary ammonium salts are obtained, e.g., by the addition of alkyl, cycloalkyl, alkenyl, cycloalkenyl or aralkyl esters of inorganic acids or organic sulfonic acids, to the free base form of the selected tertiary amino compound. The alkyl, cycloalkyl, alkenyl, cycloalkenyl, or aralkyl esters so used include such compounds as methyl chloride, methyl bromide, methyl iodide, ethyl bromide, propyl chloride, allyl chloride, ally bromide, dimethyl sulfate, methyl benzene-sulfonate, methyl p-toluene sulfonate, benzyl halides such as p-chlorobenzyl chloride and p-nitrobenzyl chloride, and the like.

The acid addition salts are prepared either by dissolving the free base in an aqueous solution containing the appropriate acid and isolating the salt by evaporating the solution, or by reacting the free base and the selected acid in an organic solvent, in which case the salt ordinarily separates directly or can be conventionally recovered by concentration of the solution or the like. Conversely the free base may be obtained conventionally by neutralizing the acid addition salt with an appropriate base such as ammonia, ammonium hydroxide, sodium carbonate or the like, extracting the liberated base with a suitable solvent, illustratively ethyl acetate or benzene, drying the extract and evaporating to dryness or fractionally distilling, or in other conventional manner.

When there are two or more basic nitrogen atoms present in the compounds of the invention, poly-acid-addition or quaternary ammonium salts may be obtained by employing the proper increased molar ratios of acid or ester to the free base.

The compounds of this invention, such as esters and amides of alpha-(1-substituted-3-pyrrolidinyloxy)diphenylacetic acid, may be prepared from either the sodium salt or the hydrochloride of the parent acid. The pyrrolidinyloxydiphenylacetic acids may be prepared by the reaction of bromodiphenylacetic acid with the appropriately substituted pyrrolidinol. Nonreactive solvents may be used to dilute the reaction mixture. The amino acids may be isolated either as the sodium salt or the hydrochloride salt. The yields range from 40 to 70%. The acids may be converted to esters or amides either through the intermediate acid chlorides, or, in the case of some esters, by reaction of the amino acid sodium salt with the appropriate alkyl halide in a nonhydroxylic solvent. Some of the esters and acids may be coverted to their acid addition salts with pharmaceutically acceptable acids such as hydrochloric acids, fumaric acid, maleic acid, etc.

The substituted pyrrolidines which may be used as starting materials are those 1-substituted pyrrolidines which have a hydroxy group bonded to the heterocyclic ring in the three position. Exemplary 1-substituted-3-hydroxypyrrolidines are 1-methyl-3-hydroxypyrrolidine,
1-ethyl-3-hydroxypyrrolidine,
1-propyl-3-hydroxypyrrolidine,
1-isopropyl-3-hydroxypyrrolidine,
1-cyclohexyl-3-hydroxypyrrolidine,
1-phenethyl-3-hydroxypyrrolidine,
1-benzyl-3-hydroxypyrrolidine, and the like. The 1-substituted-3-hydroxypyrrolidines may also have one or more methyl groups bonded to the ring in any one or more than one position, illustratively the 2, 4, or 5 positions, for example 1-ethyl-3-hydroxy-4-methylpyrrolidine, 1 - isopropyl-2 - methyl - 3 - hydroxypyrrolidine, 3-hydroxy - 1,5 - dimethylpyrrolidine, 1,2,5-, 1,2,4-, or 1,2,2-trimethyl-3-hydroxypyrrolidine, and the like. Such starting methyl-3-hydroxypyrrolidines and polymethyl-3-hydroxypyrrolidines may also be prepared by standard procedure disclosed by C. W. Ryan et al., J. Org. Chem. 27, 2901–2905 (1962) or by Lunsford in U.S. Patent 2,830,997 and in other sources cited therein.

The following preparations are given by way of illustration only and are not to be construed as limiting.

Preparation 1.—Sodium (1-methyl-3-pyrrolidinyloxy) diphenylacetate

Bromodiphenylacetic acid (14.5 g., 0.050 mole) and 1-methyl-3-pyrrolidinol (5.0 g., 0.050 mole) were heated for 10 minutes at 130–135° C. in an open beaker. The cooled reaction mixture was taken up in 20 ml. of ethanol and partitioned between dilute hydrochloric acid and ether. To the aqueous layer was added 20 ml. of 50% aqueous sodium hydroxide solution. A granular solid precipitated which was filtered off and dried in vacuo. The yield was 11.7 g. (70% of theory) of sodium (1-methyl-3-pyrrolidinyloxy)diphenylacetate.

Preparation 2.—(1-cyclohexyl-3-pyrrolidinyloxy) diphenylacetic acid hydrochloride Sodium (1-cyclohexyl-3 - pyrrolidinyloxy)diphenylacetate was prepared by the method of Preparation 1 from 1-cyclohexyl-3-pyrrolidinol and bromodiphenylacetic acid. The sodium salt was suspended in ethanol and acidified with anhydrous hydrogen chloride. The precipitated sodium chloride was filtered off and an equal volume of isopropyl ether added. The precipitated solid was recrystallized twice from a mixture of ethyl alcohol and isopropyl ether giving the (1-cyclohexyl-3-pyrrolidinyloxy)diphenylacetic acid hydrochloride, M.P. 212–215° C. (dec.).

*Analysis.*—Calcd. for $C_{24}H_{30}ClNO_3$: N, 3.39. Found: N, 3.44.

Preparation 3.—Sodium (1-benzyl-3-pyrrolidinyloxy) diphenylacetate

Bromodiphenylacetic acid (81 g., 0.28 mole) and 1-benzyl-3-pyrrolidinol (50 g., 0.28 mole) were heated together for 10 minutes at 140–145° C. The cooled reaction mixture was dissolved in 500 ml. of methanol and adjusted to pH 10 with 50% aqueous sodium hydroxide solution. Isopropyl ether was added to turbidity causing the product to crystallize. One recrystallization from a mixture of butyl acetate and methanol gave white crystals of sodium (1-benzyl-3-pyrrolidinyloxy)diphenylacetate (55 g., 0.13 mole) melting at 169–175° C. (dec.). This is 48% of the theoretical yield.

Analysis.—Calcd. for $C_{25}H_{24}NNaO_3$: N, 3.42. Found: N, 3.49.

Utilizing the process of Preparation 1 above, the following compounds are prepared from the stated starting materials:

Sodium (1-allyl-3-pyrrolidinyloxy)diphenylacetate by reacting bromodiphenylacetic acid and 1-allyl-3-pyrrolidinol.

Sodium (3-cyclohexen-1-yl-3-pyrrolidinyloxy)diphenylacetate by reacting bromodiphenylacetic acid and 3-cyclohexen-1-yl-3-pyrrolidinol.

Sodium (1 - methyl-3-pyrrolidinyloxy)bis(2 - methylphenyl)acetate by reacting bromobis(2-methylphenyl)acetic acid and 1-methyl-3-pyrrolidinol.

Sodium (1 - methyl-3-pyrrolidinyloxy) - 2,4-dimethylphenyl-2-methoxyphenylacetate by reacting bromo-(2,4-dimethylphenyl)-(2-methoxyphenyl)acetic acid and 1-methyl-3-pyrrolidinol.

Sodium (1-methyl-3-pyrrolidinyloxy)bis(4-chlorophenyl)acetate by reacting bromobis(4-chorophenyl)acetic acid and 1-methyl-3-pyrrolidinol.

Sodium (1-methyl-3-pyrrolidinyloxy)phenyl-3-trifluoromethyl-phenylacetate by reacting bromophenyl-3-trifluoromethylphenylacetic acid and 1-methyl-3-pyrrolidinol.

Sodium (1,2 - dimethyl - 3 - pyrrolidinyloxy)phenyl-(2-methyl-4-chlorophenyl)acetate by reacting bromophenyl-(2-methyl - 4 - chlorophenyl)acetic acid and 1,2-dimethyl-3-pyrrolidinol.

Sodium (1,4-dimethyl-3-pyrrolidinyloxy)phenyl - (4-dimethylaminophenyl)acetate by reacting bromophenyl-(4-dimethylaminophenyl)acetic acid and 1,4-dimethyl-3-pyrrolidinol.

Sodium (1-methyl-3-pyrrolidinyloxy)phenyl-(2-thienyl)acetate by reacting bromophenyl(2-thienyl)acetic acid and 1-methyl-3-pyrrolidinol.

Sodium (1 - methyl - 3 - pyrrolidinyloxy)phenyl-1-naphthyl-acetate by reacting bromophenyl-1-naphthylacetic acid and 1-methyl-3-pyrrolidinol.

Sodium (1-methyl-3-piperidinyloxy)diphenylacetate by reacting bromodiphenylacetic acid and 1-methyl-3-piperidinol.

Sodium (1-methyl-4-piperidinyloxy)diphenylacetate by reacting bromodiphenylacetic acid and 1-methyl-4-piperidinol.

Sodium (1,5-dimethyl-3-piperidinyloxy)diphenylacetate by reacting bromodiphenylacetic acid and 1,5-dimethyl-3-piperidinol.

Sodium (1,2-dimethyl-3-piperidinyloxy)diphenylacetate by reacting bromodiphenylacetic acid and 1,2-dimethyl-3-piperidinol.

Sodium (1,6-dimethyl-4-piperidinyloxy)diphenylacetate by reacting bromodiphenylacetic acid and 1,6-dimethyl-4-piperidinol.

Where the foregoing preparations produce a compound having a methyl or other lower-alkyl group, it is to be understood that compounds containing other lower-alkyl groups of straight or branched nature and containing up to eight carbon atoms inclusive, such as methyl, ethyl, propyl, isopropyl, butyl, sec. butyl, t. butyl, amyl, isoamyl, hexyl, heptyl, and octyl, are prepared in the same manner by substitution in the process of the appropriate different lower-alkyl starting material. Likewise, where chloro or other halogen atom is present, although chlorine is preferred, further halogen compounds including iodo, bromo, chloro, and fluoro compounds are prepared starting from the appropriate halogenated starting material. Similarly, where a methoxy or other lower-alkoxy group is present, other lower-alkoxy groups containing various lower-alkyl groups having up to eight carbon atoms inclusive are prepared in the same manner from the appropriate different lower-alkoxy starting material. Hoerover, when one dilower-alkylamino group, such as the dimethylamino group, is present in a compound, other dilower-alkylamino compounds are prepared in the same manner starting only with the selected different dilower-alkylamino compound. In the same manner, ortho and meta substituted compounds are produced instead of the para by utilizing the selected ortho or meta substituted starting compound, and vice versa. Similarly, other molecular changes are readily made.

The following examples are given by way of illustration.

Example 1.—Ethyl (1-methyl-3-pyrrolidinyloxy) diphenylacetate bifumarate

The sodium salt of (1-methyl-3-pyrrolidinyloxy)diphenylacetic acid (36.0 g., 0.111 mole) was suspended in chloroform (250 ml.) and acidified with anhydrous hydrogen chloride. The mixture was cooled and thionyl chloride (30 ml., 0.42 mole) was added cautiously. The reaction mixture was then refluxed for 20 minutes after which time infrared analysis showed conversion largely to the acid chloride. One-half of the resulting mixture was evaporated to yield a viscous oil which was then dissolved in absolute ethanol (200 ml.). The solution was refluxed for several minutes and then the excess alcohol removed by evaporation leaving an oil which was partitioned between dilute hydrochloric acid and ether. The aqueous layer was made alkaline and extracted with ether. The ether extracts were dried over sodium sulfate and the ether subsequently removed by evaporation under reduced pressure. The residual orange-colored oil was converted to the bifumarate salt and recrystallized from methyl ethyl ketone. The product was isolated in 25% yield; M.P. 149–151° C.

Analysis.—Calcd. for $C_{25}H_{29}NO_7$: C, 65.92; H, 6.42; N, 3.08. Found: C, 65.98; H, 6.51; N, 3.34.

Example 2.—Ethyl (1,2-dimethyl-3-pyrrolidinyloxy) diphenyl acetate

Utilizing the method of Example 1, sodium (1,2-dimethyl-3- pyrrolidinyloxy)diphenylacetate is reacted with thionyl chloride and subsequently with ethanol to give ethyl(1,2-dimethyl-3-pyrrolidinyloxy)diphenylacetate.

Example 3.—Isopropyl (1-methyl-3-pyrrolidinyloxy)diphenylacetate bifumarate

The acid chloride (1-methyl-3-pyrrolidinyloxy)diphenylacetyl chloride hydrochloride (0.0789 mole), prepared according to the previous example, was allowed to react with an excess of 2-propanol on a steam bath for 0.5 hour. The reaction mixture was then concentrated on a rotary evaporator under water aspirator pressure. The residue was partitioned between 6 N hydrochloric acid and ether. The acid layer was basified with 50% aqueous sodium hydroxide and extracted with chloroform. The chloroform layer was dried over sodium sulfate, the sodium sulfate removed by filtration and the chloroform removed under reduced pressure. The product was purified by fractional distillation under reduced pressure; B.P. 196–199° C. at 1.2 mm. The bifumarate salt was formed in ethyl acetate solvent and the product was isolated in 31.7% yield; M.P. 142.5–144° C.

Analysis.—Calcd. for $C_{26}H_{31}NO_7$: C, 66.50; H, 6.66; N, 2.98. Found: C, 66.39; H, 6.73; N, 3.00.

Example 4.—N-methyl-(1-methyl-3-pyrrolidinyloxy)diphenylacetamide

A chloroform solution of the acid chloride, 1-methyl-3-pyrrolidinyloxy)diphenylacetyl chloride hydrochloride (0.055 mole), prepared according to Example 2, was allowed to react with an excess of methylamine (50 g.) in absolute alcohol (150 ml.) at 0–10° C. The reaction mixture was allowed to stand overnight at room temperature and the solvents were removed by evaporation. The resultant residue was partitioned between dilute hydrochloric acid and ether, and the aqueous layer basified followed by extraction with isopropyl ether. The product was crystallized from the isopropyl ether solution and then recrystallized from isopropyl ether in a 25% yield; M.P. 119.5–121° C.

*Analysis.*—Calcd. for $C_{20}H_{24}N_2O_2$: C, 74.04; H, 7.46; N, 8.64. Found: C, 74.00; H, 7.50; N, 8.77.

Example 5.—1-[(1-methyl-3-pyrrolidinyloxy)diphenylacetyl]pyrrolidine hydrochloride An aliquot of the acid chloride, (1-methyl-3-pyrrolidinyloxy)diphenylacetyl chloride hydrochloride (0.167 mole) prepared according to Example 1, was added carefully to pyrrolidine (200 ml.) maintaining the temperature at 20–25° C. The reaction mixture was heated on a steam bath for approximately 1 hour and then concentrated with an evaporator under reduced pressure in order to remove the excess pyrrolidine. The residue was placed in chloroform, made alkaline with 50% aqueous sodium hydroxide while maintaining the temperature at less than 20° C. The chloroform layer was separated and washed with water (ca. 200 ml.) and dried over sodium sulfate. The sodium sulfate was removed by filtration and the chloroform solution concentrated under reduced pressure. The residue was dissolved in isopropyl ether using minimal amounts of methanol to bring about complete solution. The solution was acidified with ethereal hydrogen chloride and the resultant crystalline product was recrystallized from the same solvents, requiring a somewhat larger amount of methanol to effect solution. The product was isolated in 4% yield; M.P. 224.5–227° C.

*Analysis.*—Calcd. for $C_{23}H_{29}ClN_2O_2$: C, 68.90; H, 7.29; N, 6.99. Found: C, 68.67; H, 7.19; N, 6.90.

Example 6.—1-[(1-methyl-3-pyrrolidinyloxy)diphenylacetyl]-4-methylpiperazine dihydrochloride The amide was prepared by allowing (1-methyl-3-pyrrolidinyloxy)diphenylacetyl chloride hydrochloride (0.167 mole) to react with an excess of N-methylpiperazine while heating on a steam bath for 1 hour. The excess N-methylpiperazine was removed under reduced pressure, 100° C. at 20 mm. pressure. The residue was then dissolved in chloroform (200 ml.) and basified with 50% aqueous sodium hydroxide while maintaining the temperature at less than 10° C. The chloroform layer was dried over sodium sulfate, the sodium sulfate removed by filtration and the dried solution concentrated under reduced pressure at an elevated temperature (150° C. at 20 mm. pressure). The residue was dissolved in methanol and the dihydrochloride salt was formed by the addition of ethereal hydrogen chloride. A small quantity of isopropyl ether added to the methanol solution yielded the crystalline product. The crude product was then recrystallized from 95% ethanol in 9.5% yield; M.P. 276–281° C.

*Analysis.*—Calcd. for $C_{24}H_{33}Cl_2N_3O_2$: C, 61.79; H, 7.13; N, 9.01. Found: C, 61.62; H, 7.07; N, 9.04.

Example 7.—N,N-dimethyl-(1-methyl-3-pyrrolidinyloxy)diphenylacetamide bifumarate The acid chloride, (1-methyl-3-pyrrolidinyloxy)diphenylacetyl chloride hydrochloride (1 mole) prepared according to Example 1, in chloroform solution was added slowly to dimethylamine (5 moles) in benzene at 20° C. After 12 hours at room temperature, the solution was concentrated and the residue partitioned between ether and dilute hydrochloric acid. The acid layer was made strongly basic with aqueous sodium hydroxide and extracted with chloroform. The chloroform extract was washed with water, dried, concentrated and distilled. The boiling point of the product was 175–180° C. at 0.2 mm. pressure and the product was obtained in 20–25% yield. The base was converted to the bifumarate salt and recrystallized twice from isopropyl alcohol; M.P. 177–179° C.

*Analysis.*—Calcd. for $C_{25}H_{30}N_2O_6$: C, 66.06; H, 6.65; N, 6.16. Found: C, 65.94; H, 6.74; N, 5.92.

Example 8.—N,N-dimethyl-(1,2-dimethyl-3-pyrrolidinyloxy)diphenyl acetamide

Utilizing the method of Example 7, (1,2-dimethyl-3-pyrrolidinyloxy)diphenylacetyl chloride hydrochloride is reacted with dimethyl amine to give N,N-dimethyl (1,2-dimethyl-3-pyrrolidinyloxy)diphenyl acetamide.

Example 9.—Ethyl (1-benzyl-3-pyrrolidinyloxy)diphenylacetate

Sodium (1-benzyl-3-pyrrolidinyloxy)diphenylacetate (24.2 g., 0.059 mole) in 100 ml. of dimethylformamide was treated over 20 minutes at 10–15° C. with ethyl bromide (6.4 g., 0.059 mole) in 25 ml. of dimethylformamide. After 2 hours at room temperature, the reaction mixture was warmed to 95° C. for 15 minutes. The mixture was cooled and partitioned between dilute base and ethyl ether. The ether layer was washed with water, dried over anhydrous sodium sulfate and distilled in vacuo. This procedure produced ethyl (1-benzyl-3-pyrrolidinyloxy)diphenylacetate in 27% yield, identical with that prepared by the method of Example 13.

Example 10.—(1-cyclohexyl-3-pyrrolidinyloxy)-N,N-dimethyldiphenylacetamide

The acid hydrochloride of (1-cyclohexyl-3-pyrrolidinyloxy)diphenylacetic acid was formed by the addition of hydrogen chloride to the corresponding sodium salt. The thus formed acid hydrochloride (0.06 mole) was mixed with an excess of thionyl chloride (75 ml.) and the temperature raised to reflux for approximately 10 minutes. The excess thionyl chloride was removed on a rotary evaporator under reduced pressure. Chloroform (100 ml.) was added to the residue and removed on a rotary evaporator in order to facilitate the elimination of any remaining unreacted thionyl chloride. The acid chloride was dissolved in chloroform (100 ml.) and allowed to react with an excess of dimethylamine (0.75 mole) dissolved in chloroform (250 ml.). The reaction mixture was heated on a steam bath for approximately 10 minutes and then concentrated on the rotary evaporator in the usual manner. The resultant residue was partitioned between dilute aqueous hydrochloric acid and isopropyl ether. The aqueous layer was made basic with 50% aqueous sodium hydroxide and then extracted with isopropyl ether. The isopropyl ether extract was concentrated and the residue purified by fractional distillation under reduced pressure; B.P. 200–215° C. at 0.05 mm. pressure. The product was obtained in 50% yield.

*Analysis.*—Calcd. for $C_{26}H_{34}N_2O_2$: C, 76.81; H, 8.43; N, 6.89. Found: C, 76.55; H, 8.52; N, 6.91.

Example 11.—Ethyl (1-cyclohexyl-3-pyrrolidinyloxy)-diphenylacetate

The acid chloride, (1-cyclohexyl-3-pyrrolidinyloxy)diphenylacetyl chloride hydrochloride (0.060 mole) prepared according to Example 10, was allowed to react with absolute ethanol (100 ml.) under reflux for approximately 10 minutes. The reaction mixture was concentrated and the residue partitioned between isopropyl ether and dilute aqueous hydrochloric acid. Three separate layers were formed composed of a top layer of isopropyl ether, a middle water-layer and an oily bottom layer containing most of the desired hydrochloride salt. The middle and bottom layers were separated from the top isopropyl ether layer and made basic with 50% aqueous sodium hydroxide. The resultant mixture was extracted with isopropyl ether and the extracts concentrated in the usual manner. The residue was then purified by fractional distillation under reduced pressure, B.P. 200–205° C. at 0.05 mm. pressure, and the product was obtained in 50% yield.

*Analysis.*—Calcd. for $C_{26}H_{33}NO_3$: C, 76.62; H, 8.16; N, 3.44. Found: C, 76.39; H, 8.43; N, 3.66.

Example 12.—(1-benzyl-3-pyrrolidinyloxy)-N,N-dimethyldiphenylacetamide

A chloroform solution of the acid chloride, (1-benzyl-3-pyrrolidinyloxy)diphenylacetyl chloride hydrochloride prepared in a similar manner to the acid chloride described in Example 1, was allowed to react with an excess of dimethylamine dissolved in chloroform. The reaction mixture was allowed to stand for approximately 0.5 hour, concentrated and the residue partitioned between toluene and dilute aqueous sodium hydroxide. The toluene layer was extracted with dilute aqueous hydrochloric acid. The aqueous acid extract and an oil which formed during the extraction process were combined and made basic with 50% aqueous sodium hydroxide. The aqueous mixture was then extracted with isopropyl ether, concentrated and the residue purified by fractional distillation under reduced pressure; B.P. 220–230° C. at 0.1 mm. pressure.

*Analysis.*—Calcd. for $C_{27}H_{30}N_2O_2$: C, 78.23; H, 7.30; N, 6.76. Found: C, 77.60; H, 7.28; N, 6.96.

Oxalate.—M.P. 186–187.5° C.

*Analysis.*—Calcd. for $C_{29}H_{32}N_2O_6$: C, 69.03; H, 6.39; N, 5.55. Found: C, 69.12; H, 6.40; N, 5.56.

Example 13.—Ethyl (1-benzyl-3-pyrrolidinyloxy)-diphenylacetate

The preparation of the ethyl ester was carried out according to the procedure described in Example 1. Purification of the product was preformed by fractional distillation under reduced pressure; B.P. 220° C. at 0.05 mm. pressure.

*Analysis.*—Calcd. for $C_{27}H_{29}NO_3$: C, 78.04; H, 7.04; N, 3.37. Found: C, 78.05; H, 7.01; N, 3.44.

Trifluoroacetate.—M.P. 175–177.5° C.

*Analysis.*—Calcd. for $C_{29}H_{30}F_3NO_5$: C, 65.77; H, 5.71; N, 2.65. Found: C, 65.91; H, 5.79; N, 2.67.

Utilizing the process of Example 1 above, the following compounds are prepared from the stated starting materials:

Ethyl (1-allyl-3-pyrrolidinyloxy)diphenylacetate by reacting sodium (1-allyl-3-pyrrolidinyloxy)diphenylacetate and ethanol.

Ethyl (3 - cyclohexen-1-yl-3-pyrrolidinyloxy)diphenylacetate by reacting sodium (3-cyclohexen-1-yl-3-pyrrolidinyloxy)diphenylacetate and ethanol.

Ethyl (1-methyl-3-pyrrolidinyloxy)bis(2 - methylphenyl)acetate by reacting sodium (1-methyl-3-pyrrolidinyloxy)bis(2-methylphenyl)acetate and ethanol.

Ethyl (1-methyl-3-pyrrolidinyloxy)-2,4-dimethylphenyl-2-methoxyphenylacetate by reacting sodium (1-methyl-3-pyrrolidinyloxy) - 2,4 - dimethylphenyl-2-methoxyphenylacetate and ethanol.

Ethyl (1-methyl-3-pyrrolidinyloxy)bis(4 - chlorophenyl)acetate by reacting sodium (1-methyl-3-pyrrolidinyloxy)bis(4-chlorophenyl)acetate and ethanol.

Ethyl (1 - methyl-3-pyrrolidinyloxy)phenyl-3-trifluoromethylphenylacetate by reacting sodium (1-methyl-3-pyrrolidinyloxy)phenyl - 3 - trifluoromethylphenylacetate and ethanol.

Ethyl (1,2 - dimethyl-3-pyrrolidinyloxy)phenyl-2-methyl-4-chlorophenylacetate by reacting sodium (1,2-dimethyl-3-pyrrolidinyloxy)phenyl - 2 - methyl-4-chlorophenylacetate and ethanol.

Ethyl (1,4-dimethyl - 3 - pyrrolidinyloxy)phenyl-4-dimethylaminophenylacetate by reacting sodium (1,4-dimethyl-3-pyrrolidinyloxy)phenyl-4 - dimethylaminophenylacetate and ethanol.

Methyl (1 - methyl-3-pyrrolidinyloxy)diphenylacetate by reacting sodium (1-methyl-3-pyrrolidinyloxy)diphenylacetate and methanol.

Propyl (1 - methyl-3-pyrrolidinyloxy)diphenylacetate by reacting sodium (1-methyl-3-pyrrolidinyloxy)diphenylacetate and propanol.

Methyl (1,2 - dimethyl-3-pyrrolidinyloxy)diphenylacetate by reacting sodium (1,2-dimethyl-3-pyrrolidinyloxy)-diphenylacetate and methanol.

Ethyl (1 - methyl-3-pyrrolidinyloxy)phenyl-2-thienylacetate by reacting sodium (1-methyl-3-pyrrolidinyloxy)-phenyl-2-thienylacetate and ethanol.

Ethyl (1 - methyl-3-pyrrolidinyloxy)phenyl-1-naphthylacetate by reacting sodium (1-methyl-3-pyrrolidinyloxy)-phenyl-1-naphthylacetate and ethanol.

Ethyl (1 - methyl-3-piperidinyloxy)diphenylacetate by reacting sodium (1-methyl-3-piperidinyloxy)diphenylacetate and ethanol.

Ethyl (1 - methyl-4-piperidinyloxy)diphenylacetate by reacting sodium (1-methyl-4-piperidinyloxy)diphenylacetate and ethanol.

Ethyl (1,2 - dimethyl-3-piperidinyloxy)diphenylacetate by reacting sodium (1,2 - dimethyl-3-piperidinyloxy)diphenylacetate and ethanol.

Ethyl 1,6-dimethyl-4-piperidinyloxy)diphenylacetate by reacting sodium (1,6-dimethyl-4-piperidinyloxy)diphenylacetate and ethanol.

Utilizing the process of Example 6, the following compounds are prepared from the stated starting materials:

1-[(1 - propyl - 3 - pyrrolidinyloxy)diphenylacetyl]-4-lower-alkyl, e.g., ethyl-piperazine or morpholine by reacting 1-propyl-3-pyrrolidinyloxy)diphenylacetyl chloride with N-lower-alkyl, e.g., ethyl-piperazine or morpholine, respectively.

1-[(1 - lower-alkyl, e.g., methyl-3-pyrrolidinyloxy)diphenylacetyl]-piperazine or morpholine by reacting 1-[(1-lower-alkyl, e.g., methyl-3-pyrrolidinyloxy)diphenylacetyl chloride with piperazine or morpholine, respectively.

N-ethyl-(1-methyl - 3 - pyrrolidinyloxy)diphenylacetamide by reacting (1 - methyl-3-pyrrolidinyloxy)diphenylacetyl chloride with ethylamine.

N,N - diethyl(1-ethyl-3-pyrrolidinyloxy)diphenylacetamide by reacting (1-ethyl-3-pyrrolidinyloxy)diphenylacetyl chloride with diethylamine.

The compounds of this invention were evaluated as analgesics employing a modified Randall-Selitto test [Arch int. Pharmacodyn. 113, 233 (1957)]. The pyrrolidinyloxydiphenylacetic acid derivatives exhibited marked analgesic activity when tested according to this procedure.

Where the foregoing examples produce a compound having a methyl or other lower-alkyl group, it is to be understood that compounds containing other lower-alkyl groups of straight or branched nature and containing up to eight carbon atoms inclusive, such as methyl, ethyl, propyl, isopropyl, butyl, sec. butyl, t.butyl, amyl, isoamyl, hexyl, heptyl, and octyl, are prepared in the same manner by substitution in the process of the appropriate different lower-alkyl starting material. Likewise, where chloro or other halogen atom is present, although chlorine is preferred, further halogen compounds including iodo, bromo, chloro, and fluoro compounds, are prepared starting from the appropriate halogenated starting material. Similarly, where methoxy or other lower-alkoxy group is present, other lower-alkoxy groups containing various lower-alkyl groups having up to eight carbon atoms inclusive are prepared in the same manner from the appropriate different lower-alkoxy starting material. Moreover, when one dilower-alkylamino group, such as the dimethylamino group, is present in a compound, other dilower-alkylamino compounds are prepared in the same manner starting only with the selected different dilower-alkylamino compound. In the same manner, ortho and meta products are produced instead of the para by utilizing the selected ortho or meta substituted starting material, and vice versa. Similarly other molecular changes within the scope of the invention are readily made.

Formulation and administration.—Effective quantities of any of the foregoing pharmacologically active compounds may be administered to a living animal body in any one of various ways, for example, orally as in capsules or tablets, parenterally in the form of sterile solutions or suspensions, and in some cases intravenously in the form of sterile solutions. The free basic amino compounds, while effective, are preferably formulated and administered in the form of their non-toxic acid-addition or quaternary ammonium salts for purposes of convenience of crystallization, increased solubility, and the like.

Although very small quantities of the active materials of the present invention, even as low as 0.1 milligram, are effective when minor therapy is involved or in cases of administration to subjects having a relatively low body weight, unit dosages are usually five milligrams or above and preferably twenty-five, fifty or one-hundred milligrams or even higher, depending of course upon the emergency of the situation and the particular result, e.g., analgetic, desired. Five to fifty milligrams appears optimum per unit dose, while usual broader ranges appear to be one to 500 milligrams per unit dose. The active agents of the invention may be combined with other pharmacologically active agents, or with buffers, antacids or the like, for administration and the proportion of the active agent in the compositions may be varied widely. It is only necessary that the active ingredient constitute an effective amount, i.e., such that a suitable effective dosage will be obtained consistent with the dosage form employed. Obviously, several unit dosage forms may be administered at about the same time. The exact individual dosages as well as daily dosages in a particular case will of course be determined according to established medical principles under the direction of a physician or veterinarian. Results upon administration of these novel materials have thus far proved extremely gratifying.

The formulations of Example 14 are representative for the pharmacologically active compounds of the invention, but have been especially designed to embody as active ingredient the free basic compounds of Examples 1, 2, or 3, or their hydrochlorides, hydrobromides, methiodides, or like pharmaceutically acceptable salts, or the compounds of Examples 12 and 13.

Example 14.—Formulations (1) Capsules.—Capsules of 5 mg., 25 mg., and 50 mg. of active ingredient per capsule are prepared. With the higher amounts of active ingredient, reduction may be made in the amount of lactose.

| Typical blend for encapsulation | Mg. per capsule |
|---|---|
| Active ingredient, as salt | 5.0 |
| Lactose | 296.7 |
| Starch | 129.0 |
| Magnesium stearate | 4.3 |
| Total | 435.0 |

Additional capsule formulations preferably contain a higher dosage of active ingredient and are as follows:

| Ingredients | 100 mg. per capsule | 250 mg. per capsule | 500 mg. per capsule |
|---|---|---|---|
| Active ingredient, as salt | 100.0 | 250.0 | 500.0 |
| Lactose | 231.5 | 126.5 | 31.1 |
| Starch | 99.2 | 54.2 | 13.4 |
| Magnesium stearate | 4.3 | 4.3 | 5.5 |
| Total | 435.0 | 435.0 | 550.0 |

In each case, uniformly blend the selected active ingredient with lactose, starch, and magnesium stearate and encapsulate the blend.

(2) Tablets.—A typical formulation for a tablet containing 5.0 mg. of active ingredient per tablet follows. The formulation may be used for other strengths of active ingredient by adjustment of weight of dicalcium phosphate.

| | Mg. per tablet |
|---|---|
| (1) Active ingredient | 5.0 |
| (2) Corn starch | 13.6 |
| (3) Corn starch (paste) | 3.4 |
| (4) Lactose | 79.2 |
| (5) Dicalcium phosphate | 68.0 |
| (6) Calcium stearate | 0.9 |
| | 170.1 |

Uniformly blend 1, 2, 4, and 5. Prepare 3 as a 10 percent paste in water. Granulate the blend with starch paste and pass the wet mass through an eight mesh screen. The wet granulation is dried and sized through a twelve mesh screen. The dried granules are blended with the calcium stearate and compressed.

Additional tablet formulations preferably contain a higher dosage of the active ingredient and are as follows:

A.—50 MG. TABLET

| Ingredients: | Mg. per tablet |
|---|---|
| Active ingredient, as salt | 50.0 |
| Lactose | 90.0 |
| Milo starch | 20.0 |
| Corn starch | 38.0 |
| Calcium stearate | 2.0 |
| Total | 200.0 |

Uniformly blend the active ingredient, lactose, milo starch and corn starch. This blend is granulated using water as a granulating medium. The wet granules are passed through an eight mesh screen and dried at 140 to 160 degrees Fahrenheit overnight. The dried granules are passed through a number ten mesh screen and blended with the proper amount of calcium stearate and this blend is then converted into tablets on a suitable tablet press.

B.—100 MG. TABLET

| Ingredients: | Mg. per tablet |
|---|---|
| Active ingredient, as salt | 100.0 |
| Lactose | 190.0 |
| Dicalcium phosphate | 172.2 |
| Starch | 54.0 |
| Milo starch | 21.6 |
| Calcium stearate | 2.2 |
| Total | 540.0 |

Uniformly blend the active ingredient, lactose, dicalcium phosphate, starch and milo starch. This blend is granulated with water and the wet mass is passed through a number eight mesh screen. The wet granules are dried at 140–160 degrees Fahrenheit overnight. The dried granules are passed through a number ten mesh screen. These dried granules are blended with the proper weight of calcium stearate and the lubricated granules are then converted into tablets on a suitable tablet press.

C.—250 MG. TABLET

| Ingredients: | Mg. per tablet |
|---|---|
| Active ingredient, as salt | 250.0 |
| Corn starch | 56.0 |
| Carbowax 6000 (polyethylene glycol of M.W. approximately 6000) | 25.0 |
| Lactose | 35.0 |
| Magnesium stearate | 4.0 |
| Total | 370.0 |

Uniformly blend the active ingredient, corn starch, Carbowax 6000, lactose, and one-half the weight of magnesium stearate required. This blend is then "slugged" on a suitable tablet press. These "slugs" are granulated through a ten mesh screen on an oscillating granulator. These granules are then blended with the remainder of the magnesium stearate and the lubricated granules are then converted into tablets on a suitable tablet press.

D.—500 MG. TABLET

| Ingredients: | Mg. per tablet |
|---|---|
| Active ingredient, as salt | 500.0 |
| Corn starch (wet) | 86.4 |
| Milo starch | 32.4 |
| Calcium stearate | 3.2 |
| Corn starch (dry) | 26.0 |
| Total | 648.0 |

Uniformly blend the active ingredient, corn starch and milo starch. This blend is wet granulated using water and the wet mass is passed through a number eight mesh screen. These wet granules are dried overnight at 140–160 degrees Fahrenheit. The dried granules are passed through a number ten mesh screen. The dried granules and weighed amounts of corn starch and calcium stearate are uniformly blended and these lubricated granules are compressed on a suitable tablet press.

(3) Injectable—2% sterile solution.

| | Per cc. |
|---|---|
| Active ingredient | mg__ 20 |
| Preservative, e.g., chlorobutanol | %w./v__ 0.5 |
| Water for injection, q.s. | |

Prepare solution, clarify by filtration, fill into vials, seal, and autoclave.

(4) The pharmacologically active compounds provided by the present invention may also be administered successfully by embodying an effective quantity thereof in an injectable suspension for injection into an animal body, in oral powders, suspensions or syrups, and in other acceptable dosage forms.

Various modifications and equivalents will be apparent to one skilled in the art and may be made in the compounds, compositions, methods, and procedures of the present invention.

I claim:

1. A compound having the formula:

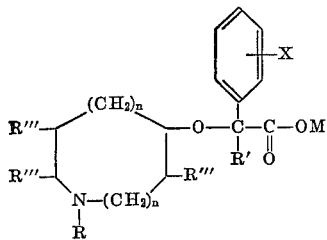

wherein R is selected from the group consisting of lower-alkyl, lower-alkenyl, phenyllower-alkyl, cycloalkyl having 3–9 carbon atoms inclusive, and cycloalkenyl having 3–9 carbon atoms, inclusive,
wherein R' is selected from the group consisting of phenyl, lower-alkylphenyl, dilower-alkylphenyl, lower-alkoxyphenyl, halophenyl, trifluoromethylphenyl, lower-alkylhalophenyl, dilower-alkyl-aminophenyl, thienyl, and naphthyl,
wherein M is selected from the group consisting of hydrogen and alkali metals,
wherein R''' is selected from the group consisting of hydrogen and methyl, a maximum of one R''' being other than hydrogen,
wherein X is selected from the group consisting of hydrogen, lower-alkyl, lower-alkoxy, and halogen, and wherein n is 0 or 1, no more than one n being 1.

2. An alkali metal (1-lower-alkyl-3-pyrrolidinyloxy)diphenylacetate.

3. An alkali metal (1 - cycloalkyl having 3–9 carbon atoms inclusive 3-pyrrolidinyloxy)diphenylacetate.

4. An alkali metal (1-phenyllower-alkyl-3-pyrrolidinyloxy)diphenylacetate.

5. An acid addition salt of (1-lower-alkyl-3-pyrrolidinyloxy)diphenylacetic acid.

6. An acid addition salt of (1-cycloalkyl having 3–9 carbon atoms inclusive 3-pyrrolidinyloxy)diphenylacetic acid.

7. An acid addition salt of (1-phenyllower-alkyl-3-pyrrolidinyloxy)diphenylacetic acid.

8. An alkali metal (1-lower-alkyl-3-piperidinyloxy)diphenylacetate.

9. An alkali metal (1-cycloalkyl having 3–9 carbon atoms inclusive 3-piperidinyloxy)diphenylacetate.

10. An alkali metal (1 - phenyllower-alkyl-3-piperidinyloxy)diphenylacetate.

11. An acid addition salt of (1-lower-alkyl-3-piperidinyloxy)diphenylacetic acid.

12. An acid addition salt of (1-cycloalkyl having 3–9 carbon atoms inclusive 3 - piperidinyloxy)diphenylacetic acid.

13. An acid addition salt of (1-phenyllower-alkyl-3-piperidinyloxy)diphenylacetic acid.

14. Sodium (1 - methyl - 3-pyrrolidinyloxy)diphenylacetate.

15. (1 - cyclohexyl - 3-pyrroldinyloxy)diphenylacetic acid hydrochloride.

16. Sodium (1 - benzyl - 3-pyrrolidinyloxy)diphenylacetate.

17. A compound having the formula:

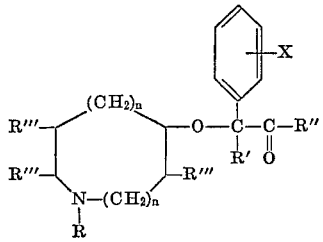

wherein R is selected from the group consisting loweralkyl, lower-alkenyl, phenyllower-alkyl, cycloalkyl having 3–9 carbon atoms inclusive, and cycloalkenyl having 3–9 carbon atoms inclusive,
wherein R' is selected from the group consisting of phenyl, lower-alkylphenyl, dilower-alkylphenyl, lower-alkoxyphenyl, halophenyl, trifluoromethylphenyl, lower - alkylhalophenyl, dilower-alkyl-aminophenyl, thienyl, and naphthyl,
wherein R'' is selected from the group consisting of lower-alkoxy, amino, lower-alkylamino, diloweralkylamino, cycloalkylamino wherein the cycloalkyl contains 3–9 carbon atoms inclusive, piperazino, and loweralkylpiperazino.
wherein R''' is selected from the group consisting of hydrogen and methyl, a maximum of one R''' being other than hydrogen,
wherein X is selected from the group consisting of hydrogen, lower-alkyl, lower-alkoxy, and halogen, and wherein n is 0 or 1, no more than one n being 1.

18. Lower-alkyl (1 - lower-alkyl-3-pyrrolidinyloxy)diphenylacetate.

19. Lower-alkyl (1 - lower-alkenyl-3-pyrrolidinyloxy) diphenylacetate.

20. Lower-alkyl (1 - phenyllower-alkyl-3-pyrrolidinyloxy)diphenylacetate.

21. Lower-alkyl (1-cycloalkyl having 3–9 carbon atoms inclusive 3-pyrrolidinyloxy)diphenylacetate.

22. Lower-alkyl (1 - cycloalkenyl having 3–9 carbon atoms inclusive 3-pyrrolidinyloxy)diphenylacetate.

23. (1 - lower - alkyl-3-pyrrolidinyloxy)diphenylacetamide.

24. (1 - lower - alkenyl - 3-pyrrolidinyloxy)diphenylacetamide.

25. (1 - phenyllower - alkyl - 3-pyrrolidinyloxy)diphenylacetamide.

26. (1-cycloalkyl having 3–9 carbon atoms inclusive 3-pyrrolidinyloxy)diphenylacetamide.

27. (1-cycloalkenyl having 3–9 carbon atoms inclusive 3-pyrrolidinyloxy)diphenylacetamide.

28. N - dilower - alkyl - (1-lower-alkyl-3-pyrrolidinyloxy)diphenylacetamide.

29. N - dilower - alkyl - (1-lower-alkenyl-3-pyrrolidinyloxy)diphenylacetamide.

30. N - dilower - alkyl - (1 - phenyllower-alkyl-3-pyrrolidinyloxy)diphenylacetamide.

31. N-dilower-alkyl-(1-cycloalkyl having 3–9 carbon atoms inclusive 3-pyrrolidinyloxy)diphenylacetamide.

32. N-dilower-alkyl-(1-cycloalkenyl having 3–9 carbon atoms inclusive 3-pyrrolidinyloxy)diphenylacetamide.

33. Ethyl (1 - methyl - 3-pyrrolidinyloxy(diphenylacetate bifumarate.

34. Isopropyl (1 - methyl-3-pyrrolidinyloxy)diphenylacetate bifumarate.

35. N - methyl - (1 - methyl - 3 - pyrrolidinyloxy)diphenylacetamide.

36. 1 - [(1 - methyl-3-pyrrolidinyloxy)diphenylacetyl] pyrrolidine hydrochloride.

37. 1 - [(1 - methyl-3-pyrrolidinyloxy)diphenylacetyl]-4-methylpiperazine dihydrochloride.

38. N,N - dimethyl - (1 - methyl-3-pyrrolidinyloxy)diphenylacetamide bifumarate.

39. Ethyl (1-benzyl-3-pyrrolidinyloxy)diphenylacetate.

40. (1 - cyclohexyl - 3 - pyrrolidinyloxy)-N,N-dimethyldiphenylacetamide.

41. Ethyl (1 - cyclohexyl - 3-pyrrolidinyloxy)diphenylacetate.

42. (1 - benzyl - 3 - pyrrolidinyloxy)-N,N-dimethyldiphenylacetamide.

43. Ethyl (1,2 - dimethyl-3-pyrrolidinyloxy)diphenylacetate.

44. N,N - dimethyl - (1,2-dimethyl-3-pyrrolidinyloxy)-diphenylacetamide.

45. N - lower - alkyl - (1-lower-alkyl-3-pyrrolidinyloxy)diphenylacetamide.

46. N - lower - alkyl - (1-lower-alkenyl-3-pyrrolodinyloxy)diphenylacetamide.

47. N - lower - alkyl - (1- phenyllower alkyl - 3-pyrrolidinyloxy)diphenylacetamide.

48. N - lower-alkyl-(1-cycloalkyl having 3–9 carbon atoms inclusive 3-pyrrolidinyloxy)diphenylacetamide.

49. N-lower-alkyl-(1-cycloalkenyl having 3–9 carbon atoms inclusive 3-pyrrolidinyloxy)diphenylacetamide.

References Cited

UNITED STATES PATENTS

| | | | |
|---|---|---|---|
| 2,708,194 | 5/1955 | Blicke | 260—294 |
| 3,128,277 | 4/1964 | Temple et al. | 260—294 |
| 3,280,196 | 10/1966 | Schilling | 260—326.5 |

JOHN D. RANDOLPH, Primary Examiner

U.S. Cl. X.R.

260—243, 247.2, 268, 294.7, 326.3, 326.5; 424—267, 274